RESILIENT CORE HOLDER FOR PRESSING HEAD SECTIONS INTO ALIGNMENT

Filed July 29, 1963

INVENTORS
MICHAEL B. MARYATT
HENRY V. MILEWSKI
BY Robert Mednick
ATTORNEY 3,311,711

RESILIENT CORE HOLDER FOR PRESSING HEAD SECTIONS INTO ALIGNMENT

Michael B. Maryatt, Sunnyvale, and Henry V. Milewski, Jr., Redwood City, Calif., assignors to Mach-Tronics, Inc., Mountain View, Calif., a corporation of California Filed July 29, 1963, Ser. No. 298,315
6 Claims. (Cl. 179—100.2)

The present invention relates to a magnetic transducer head, and more particularly relates to a magnetic transducer head for recording and reproducing a wide band of frequencies on a magnetic record medium.

A magnetic transducer head for recording on or reproducing information from magnetic tape may comprise two adjacent magnetic core sections with a non-magnetic spacer therebetween mounted directly on a mounting structure. An exciting coil is wound around the core. The so called front gap of the core is the one past which the magnetic record medium is guided, the other gap in the rear of the magnetic transducer provides symmetry of construction and is useful in causing cancellation of the effects of external magnetic fields.

In video recording, a band width of several megacycles is recorded and reproduced on a very narrow track width on magnetic tape. It is therefore desirable that the transducer head be of very small size and capable of producing or reproducing a sharply defined magnetic field. As high transducer head to tape speeds are utilized, it is desirable to produce a rigid sturdy head having a core of small size and precise dimensions being bonded tightly together and accurately aligned.

One type of magnetic transducer head suitable for video recording and reproducing utilizes a pair of core sections of metallic alloys shaped by cutting or molding into a pair of matching magnetic plate sections with a non-magnetic spacer separating the plate sections to form a front magnetic gap. As these magnetic plate sections are very small, say approximately 0.1 inch in length and 0.7 inch in width, and less than 0.01 inch in thickness, extreme difficulty is experienced in correctly aligning these plate sections to form the desired front gap past which the magnetic tape is guided, and to maintain the precise alignment thereof. Accordingly, time consuming procedures are utilized which involve aligning equipment and tools. Even then the problems involved are not permanently solved, since subsequent misalignment may occur. For example, if the magnetic core sections have been correctly aligned, and the exciting coil thereon is then soldered to connecting leads, the uneven temperature distribution resulting from the application of a soldering iron or other heating device will cause misalignment of the core sections upon cooling to room temperature.

The present invention solves the above described problems and others in the prior art. Instead of having an arrangement in which magnetic cores are mounted directly on a core mounting structure, the present invention comprises a pair of magnetic core sections and a specially shaped core holder for aligning the core sections, clamping the core sections together against a magnetic spacer therebetween, and maintaining the desired alignment and clamping effect during operation and handling thereof.

It is therefore an object of the invention to provide a magnetic transducer head for video recording and reproducing that includes a pair of core sections pressed together and precisely aligned.

Another object of this invention is to provide a magnetic transducer head of small size capable of being easily and quickly mounted on a mounting structure.

Still another object of this invention is to provide a small magnetic transducer head in which magnetic core sections are tightly and uniformly pressed together against a non-magnetic spacer.

Still another object of this invention is to provide a small transducer head assembly in which a pair of magnetic core sections are held together in a specially shaped core holder which aligns the core sections and maintains such alignment.

A further object of this invention is to provide a small transducer head in which the core sections are simultaneously pressed together against a non-magnetic spacer therebetween and pressed against aligning shoulders of a core holder into a desired alignment.

Still a further object of this invention is to provide a small transducer head capable of being mounted on a transducer head mounting structure, and being pre-assembled in a desired alignment.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however that the drawings are for the purpose of illustration and description only, and are not intended as a definition of the limits of the invention.

Figures 1, 2:
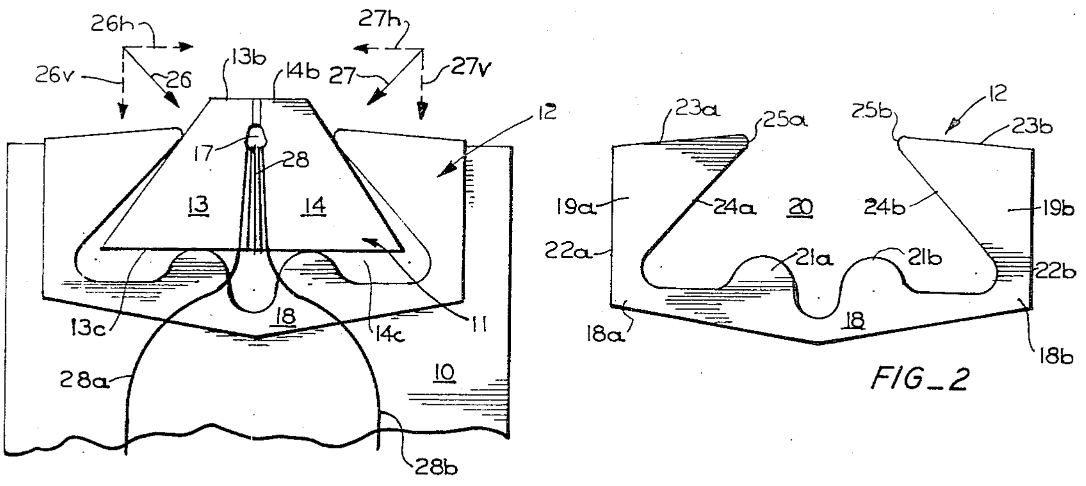
FIG. 1 is an enlarged front view showing a magnetic transducer head of this invention in assembled form.
FIG. 2 is a front view of the core holder utilized in the assembled magnetic transducer head seen in FIG. 1.
Figure 3:
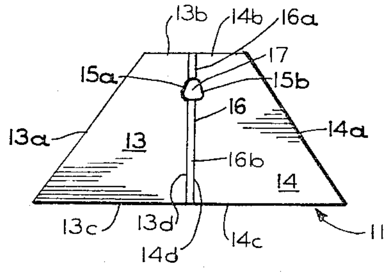
FIG. 3 is a front view of the pair of matching magnetic core sections used in the magnetic transducer head shown in FIG. 1.

Referring now to the figures, there is seen in FIG. 1 an assembled form of an embodiment of this invention showing a core mounting structure 10, a core generally designated as 11, and a core holder generally designated as 12. As more clearly seen in FIGS. 3 and 4, core 11 includes a pair of matching magnetic plate sections 13 and 14 made of magnetic metallic alloys which are either cut or moulded into shape. Each of magnetic sections 13 and 14 is seen to have an inclined side *13a* and *14a* respectively, a magnetic tape contact edge *13b* and *14b* respectively, a bottom edge *13c* and *14c* respectively, and a straight side *13d* and *14d* respectively. Along the straight sides of the magnetic sections 13 and 14, notches *15a* and *15b* respectively are cut out equal distances from and near magnetic tape contact edges *13b* and *14b*. Magnetic sections 13 and 14 are placed with its straight sides *13d* and *14d* separated by a non-magnetic spacer 16 and with notches *15a* and *15b* forming a coil aperture 17. Non-magnetic spacer 16 is interrupted by coil aperture 17 to comprise spacer segments *16a* and *16b* between the straight sides *13d* and *14d* of magnetic sections 13 and 14. Non-magnetic spacer segments *16a* and *16b* may each be a thin foil of non-magnetic material such as beryllium copper, or they may be vacuum deposited layers of any suitable non-magnetic material on the surfaces of the straight sides of the magnetic core sections.

Figure 4:
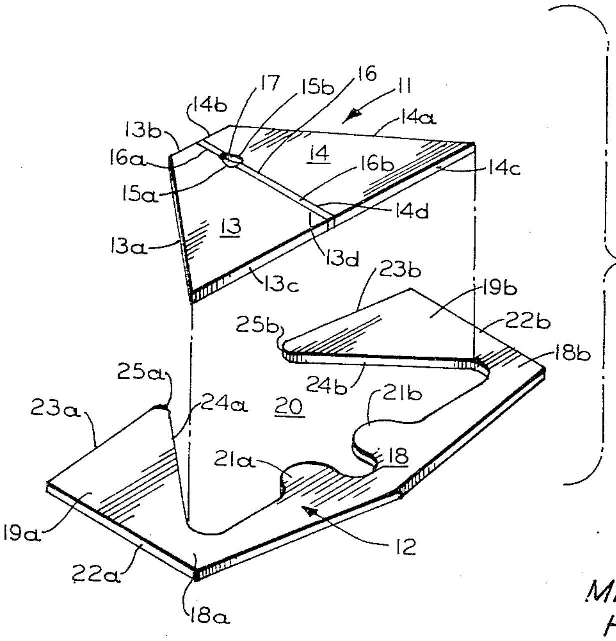
FIG. 4 are perspective views of the core holder and core sections shown in FIG. 2 and FIG. 3 respectively, illustrating the assembly thereof.

As seen more clearly in FIGS. 2 and 4, core holder 12 is preferably formed from a plate of non-magnetic material having a thickness corresponding to that of magnetic plate sections 13 and 14. This non-magnetic material should be capable of being stretched within its elastic limit to provide a force tending to restore the material to its unstressed form, e.g., aluminum. Core holder 12 includes a body member 18 and flexible arms *19a* and *19b* extending from the ends *18a* and *18b* of body member 18 to form a recess 20 for receiving core 11. Extending from body member 18 toward recess 20 are a pair of aligning shoulders 21*a* and 21*b* for aligning bottom edges 13*c* and 14*c* of magnetic plate sections 13 and 14 respectively. Flexible arms 19*a* and 19*b* are seen to have straight sides 22*a* and 22*b*, slightly inclined sides 23*a* and 23*b*, and inclined sides 24*a* and 24*b* forming free ends 25*a* and 25*b* extending inwardly toward recess 20.

The straight line distance between free ends 25*a* and 25*b* is slightly less than the distance between the corresponding contacting points on inclined sides 13*a* and 14*a* of magnetic sections 13 and 14 as seen in FIGS. 1 and 4. It will therefore be realized that the effective length along core holder 12 from free ends 25*a* and 25*b* of flexible arms 19*a* and 19*b* is long with respect to the difference in direct line distance between free ends 25*a* and 25*b* and its contacting points on inclined sides 13*a* and 14*a* of magnetic sections 13 and 14. Flexible arms 19*a* and 19*b* can then be easily stretched within the elastic limit of the material thereof to separate free ends 25*a* and 25*b* to engage inclined sides 13*a* and 14*a* to press magnetic sections 13 and 14 together against said sides with forces shown diagrammatically by arrows 26 and 27 in FIG. 1. The horizontal components 26*h* and 27*h* of forces 26 and 27 will press core sections 13 and 14 tightly together against non-magnetic spacer 16, and the vertical components 26*v* and 27*v* will press core sections 13 and 14 to bear against aligning shoulders 21*a* and 21*b* respectively. These forces will align core sections 13 and 14 and restore the alignment thereof if any temporary disturbance of such alignment should occur.

In assembling the magnetic transducer head of this invention, core sections 13 and 14 are placed adjacent to each other with straight sides 13*d* and 14*d* separated by non-magnetic spacer 16 and with notches 15*a* and 15*b* forming coil aperture 17, as seen in FIG. 4. Core sections 13 and 14 are placed in recess 20 with bottom edges 13*c* and 14*c* resting on aligning shoulders 21*a* and 21*b* respectively. Then, flexible arms 19*a* and 19*b* are stretched to separate free ends 25*a* and 25*b* to engage sides 13*a* and 14*a* of core sections 13 and 14 respectively. Coil 28 is then wound through coil aperture 17 and around bottom edges 13*c* and 14*c* of magnetic sections 13 and 14. Thereafter core holder 12 is secured to a core mounting structure 10 by cementing with epoxy or the like as seen in FIG. 1. Coil leads 28*a* and 28*b* are directed along core mounting structure 10 to be connected to appropriate electronic circuitry (not shown).

When a magnetic record medium such as magnetic tape is guided along magnetic tape contact edges 13*b* and 14*b* of core sections 13 and 14, the magnetic transducer head of the invention will record or reproduce information on the magnetic record medium. Magnetic flux utilized for recording or reproducing operation is then developed in the front or useful non-magnetic gap formed between straight sides 13*d* and 14*d* and extends from the magnetic tape contact edges 13*b* and 14*b* to coil aperture 17. This developed magnetic flux extends beyond the contact edges 13*b* and 14*b* through the magnetic record medium guided along the contact edges 13*b* and 14*b*. The non-magnetic gap formed by non-magnetic spacer 16 between coil aperture 17 and bottom edges 13*c* and 14*c* forms the rear gap of the magnetic transducer head and provides magnetic and physical symmetry of construction.

In order to be capable of handling video signals having a wide band with high frequency components in the order of 4 megacycles, a magnetic transducer head should be physically small and have sharply defined boundaries with core sections securely bonded and accurately aligned. The magnetic transducer head of this invention provides a simple and inexpensive arrangement capable of having such characteristics.

Having herein described the invention, what is claimed as new is:

1. A magnetic transducer head comprising: a core including a pair of magnetic sections with inclined sides and a non-magnetic spacer separating the magnetic sections; a core holder including a body member having aligning shoulders and having flexible arms extending inwardly from the ends of the body member to form a recess for receiving the core, said core being mounted in the recess formed in said core holder with each of said flexible arms engaging the inclined side of one of the magnetic sections of the core, said flexible arms urging the magnetic sections in a direction to press the magnetic sections together against its non-magnetic spacer, and said flexible arms urging the magnetic sections in another direction to bear against the aligning shoulders of the body member; and a core mounting structure, said core holder being secured to the core mounting structure.

2. A magnetic transducer head comprising: a core including a pair of magnetic sections; a non-magnetic spacer separating the magnetic sections, said magnetic sections having magnetic tape contact edges on one end, bottom edges at the opposite end, and two inclined sides; a coil wound on said core; a core holder including a body member having aligning shoulders and having flexible arms extending inwardly from the ends of the body member to form a recess for receiving the core, said core being mounted in the recess formed in said core holder with the flexible arms stretched to engage the inclined sides of the core, said flexible arms urging the magnetic sections in a direction to press the magnetic sections together against its non-magnetic spacer, and said flexible arms urging the magnetic sections in another transverse direction to bear against the aligning shoulders of the body member; and a core mounting structure, said core holder being secured to the core mounting structure.

3. A magnetic transducer head comprising: a core including a pair of adjacent magnetic sections having a coil aperture therebetween and a non-magnetic spacer separating the magnetic sections, said magnetic sections forming magnetic tape contact edges on one end, bottom edges at its opposite end, and two inclined sides; a coil wound through the coil aperture on said core; and a core holder including a body member and flexible arms extending inwardly from the body member to form a recess for receiving the core, the body member having aligning shoulders to contact the bottom edges of the magnetic sections of the core, and the core being mounted in said recess with said flexible arms stretched to contact the inclined sides of the core, said flexible arms urging the magnetic sections in a direction and to press the magnetic sections together against the non-magnetic spacer and said flexible arms urging the magnetic sections in another transverse direction to bear against the aligning shoulders of the body member.

4. A magnetic transducer head comprising: a core including a pair of magnetic sections with inclined sides; a non-magnetic spacer separating the magnetic sections; a coil wound on said core; a core holder including a body member with flexible arms extending inwardly from the body member to form a recess for receiving the core, the body member having aligning shoulders to contact the bottom edges of the magnetic sections of the core, the core being mounted in said recess with said flexible arms engaging the inclined sides of the magnetic sections of the core, said flexible arms urging the magnetic sections in a direction to press the magnetic sections together against its non-magnetic spacer, and said flexible arms urging the magnetic sections in another direction to bear against the aligning shoulders of the body member; and a core mounting structure, said core holder being secured to the core mounting structure.

5. A magnetic transducer head comprising: a core including a pair of magnetic sections, each section having a magnetic tape contact edge, a bottom edge, an inclined side, and a straight side, the straight sides of the magnetic sections being adjacent to each other with adjoining notches along the edges thereof forming a coil aperture; a non-magnetic spacer separating the straight sides of the magnetic sections; a coil wound through the coil aperture and around the bottom edges of the core magnetic sections; and a core holder including a body member with aligning shoulders to contact the bottom edges of the magnetic sections and including flexible arms extending inwardly from the ends of the body member to form a recess for receiving the core, said core being mounted in the recess formed in said core holder with said magnetic tape contact edges extending beyond said recess, and with each of the flexible arms of the core holder engaging the inclined side of one of the magnetic sections of the core, said flexible arms urging the magnetic sections in a direction to press the magnetic sections together against its non-magnetic spacer, and to press the magnetic sections in another direction to bear against the aligning shoulders of the body member.

6. A magnetic transducer head comprising: a core including a pair of magnetic plate sections, each section having a magnetic tape contact edge, a bottom edge, an inclined side, and a straight side, the straight sides of the magnetic sections being adjacent to each other with adjoining notches along the edges thereof forming a coil aperture, a non-magnetic spacer separating the straight sides of the magnetic sections between the coil aperture and the magnetic tape contact edges of the core forming a front magnetic gap, a non-magnetic spacer separating the straight sides of the magnetic sections between the coil aperture and bottom edges of the core forming a rear magnetic gap; a coil wound through the coil aperture and around the bottom edges of the core magnetic sections; a core holder including a body member with aligning shoulders to contact each of the bottom edges of the magnetic sections on each side of said coil, and including flexible arms extending inwardly from the ends of the body member to form a recess for receiving the core, said core being mounted in the recess formed in said core holder with said magnetic tape contact edges extending beyond said recess, and with the free ends of the flexible arms of the core holder engaging the inclined sides of the core to urge the magnetic sections in a direction to press the magnetic sections together against said non-magnetic spacer and to urge the magnetic sections in a transverse direction to press each of the magnetic sections to bear against an aligning shoulder of the body member; and a core mounting structure, said core holder being secured to the core mounting structure.

References Cited by the Examiner

UNITED STATES PATENTS

| | | | |
|---|---|---|---|
| 2,658,113 | 11/1953 | Holmes | 179—100.2 |
| 2,866,011 | 12/1958 | Kornei | 179—100.2 |
| 3,243,521 | 3/1966 | Lock | 179—100.2 |

L. G. KURLAND, *Assistant Examiner.*

BERNARD KONICK, *Primary Examiner.*